United States Patent
Takahashi et al.

(10) Patent No.: US 11,683,454 B2
(45) Date of Patent: Jun. 20, 2023

(54) IN-CABIN MONITORING SYSTEM AND IN-CABIN DETECTION METHOD

(71) Applicant: Panasonic Intellectual Property Management Co., Ltd., Osaka (JP)

(72) Inventors: Hideki Takahashi, Osaka (JP); Shinji Takenaka, Kanagawa (JP); Yoshiteru Mino, Osaka (JP); Tatsuki Hotani, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/671,290

(22) Filed: Feb. 14, 2022

(65) Prior Publication Data

US 2022/0321845 A1 Oct. 6, 2022

(30) Foreign Application Priority Data

Mar. 30, 2021 (JP) .............................. JP2021-058776

(51) Int. Cl.
| | |
|---|---|
| H04N 7/18 | (2006.01) |
| B60Q 3/74 | (2017.01) |
| G06V 20/59 | (2022.01) |
| H04N 23/56 | (2023.01) |
| B60R 11/04 | (2006.01) |
| B60R 11/00 | (2006.01) |

(52) U.S. Cl.
CPC ............... *H04N 7/188* (2013.01); *B60Q 3/74* (2017.02); *B60R 11/04* (2013.01); *G06V 20/59* (2022.01); *H04N 23/56* (2023.01); *B60R 2011/001* (2013.01); *B60R 2011/0005* (2013.01); *B60R 2011/0022* (2013.01); *B60R 2011/0028* (2013.01); *B60R 2011/0033* (2013.01)

(58) Field of Classification Search
CPC ........ H04N 7/188; H04N 23/56; G06V 20/59; B60Q 3/74
See application file for complete search history.

(56) References Cited

U.S. PATENT DOCUMENTS

| | | | |
|---|---|---|---|
| 2018/0225890 A1* | 8/2018 | Jales Costa | G06V 10/758 |
| 2020/0293799 A1* | 9/2020 | Herman | G06T 7/586 |
| 2020/0346602 A1* | 11/2020 | Yokoi | A47C 7/62 |
| 2022/0250589 A1* | 8/2022 | Schmalenberg | B60Q 3/80 |

FOREIGN PATENT DOCUMENTS

JP 2006-155483 6/2006

* cited by examiner

*Primary Examiner* — Rowina J Cattungal
(74) *Attorney, Agent, or Firm* — Greenblum & Bernstein, P.L.C.

(57) ABSTRACT

An in-cabin monitoring system includes a camera which captures an image of an inside of a cabin of a vehicle, a light source which irradiates the inside of the cabin with light, and a controller which controls the camera and the light source. The light source is capable of emitting first light which is light to be emitted when checking whether a person is present using the camera and second light which is stronger than the first light. The controller captures an image of the inside of the cabin using the camera while causing the light source to emit the second light, before the person gets in the vehicle and after the person gets out of the vehicle.

10 Claims, 3 Drawing Sheets

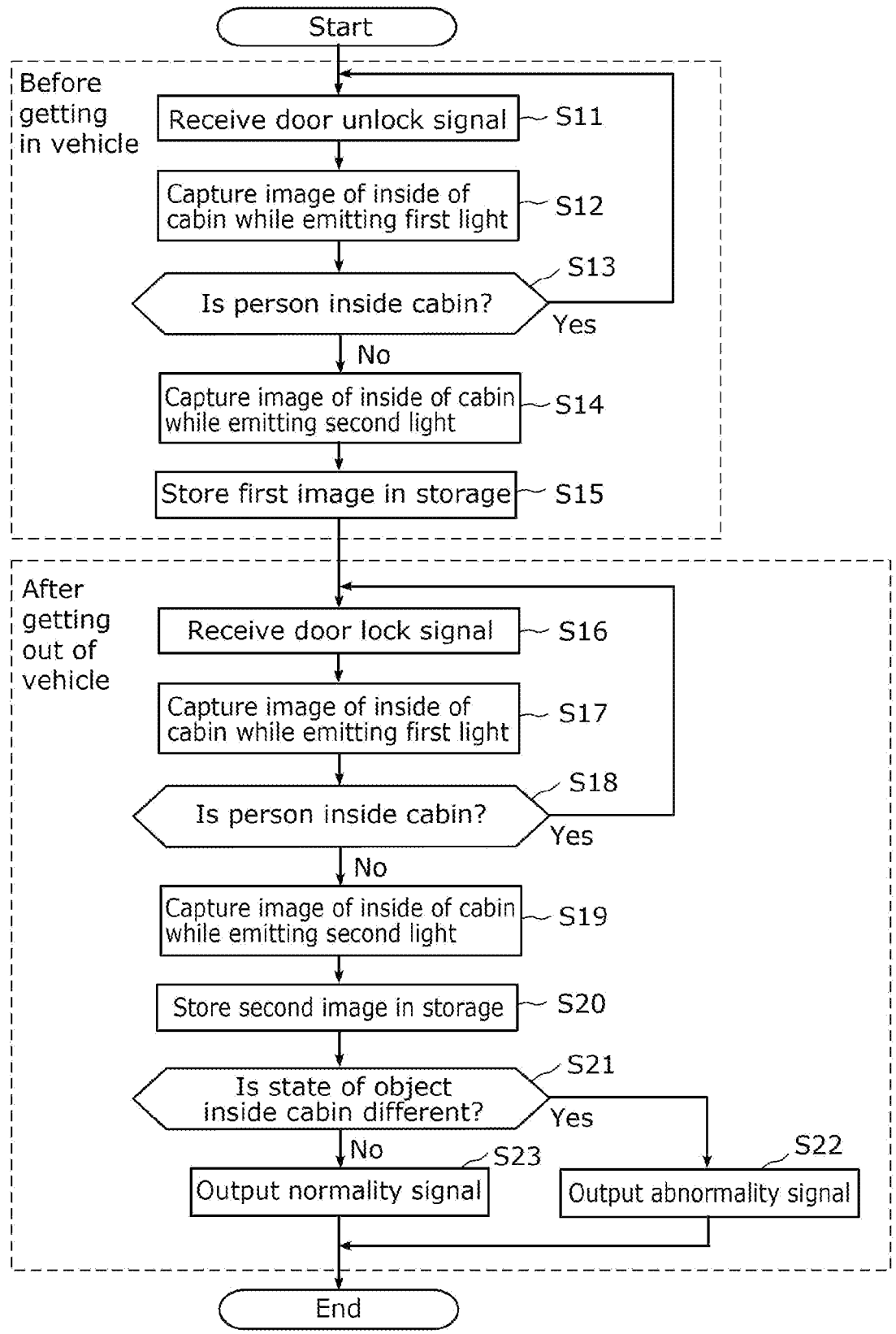

IN-CABIN MONITORING SYSTEM AND IN-CABIN DETECTION METHOD

CROSS REFERENCE TO RELATED APPLICATION

The present application is based on and claims priority of Japanese Patent Application No. 2021-058776 filed on Mar. 30, 2021.

FIELD

The present disclosure relates to an in-cabin monitoring system which monitors an inside of a cabin of a vehicle and an in-cabin detection method.

BACKGROUND

In-cabin monitoring systems which monitor insides of cabins of vehicles are known in the related art. As one example of such in-cabin monitoring systems, PTL 1 discloses a technique of detecting an object based on a change in concentration of an image captured while the object is being irradiated with light having a predetermined light quantity and a change in concentration of an image captured while the object is being irradiated with light having a light quantity smaller than the predetermined light quantity. This technique enables detection of the object even when receiving ambient light.

CITATION LIST

Patent Literature

PTL 1: Japanese Unexamined Patent Application Publication No. 2006-155483

SUMMARY

However, the in-cabin monitoring system disclosed in PTL 1 can be improved upon. An in-cabin monitoring system according to one aspect of the present disclosure is capable of improving upon the above related art.

To achieve the above object, the in-cabin monitoring system according to one aspect of the present disclosure is an in-cabin monitoring system including: a camera which captures an image of an inside of a cabin of a vehicle; a light source which irradiates the inside of the cabin with light; and a controller which controls the camera and the light source. The light source is capable of emitting first light which is to be emitted when checking whether a person is present using the camera and second light which is light stronger than the first light, and before the person gets in the vehicle and after the person gets out of the vehicle, the controller captures an image of the inside of the cabin using the camera while causing the light source to emit the second light.

To achieve the above object, the in-cabin detection method according to one aspect of the present disclosure is an in-cabin detection method of detecting an inside of a cabin in a vehicle, the in-cabin detection method including: capturing an image of the inside of the cabin while irradiating the inside of the cabin with light before a person gets in the vehicle, the light being stronger than light to be irradiated when checking whether the person is present using a camera; capturing an image of the inside of the cabin while irradiating the inside of the cabin with the light after the person gets out of the vehicle, the light being stronger than the light to be irradiated when checking whether the person is present using the camera; and comparing the image of the inside of the cabin captured before the person gets in the vehicle with the image of the inside of the cabin captured after the person gets out of the vehicle.

These comprehensive or specific aspects may be implemented with a system, a method, an integrated circuit, a computer program, or a computer-readable recording medium such as a CD-ROM, or any combination of a system, a method, an integrated circuit, a computer program, and a recording medium. The recording medium may be a non-transitory recording medium.

The in-cabin monitoring system according to one aspect of the present disclosure can be further improved.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 5 is a flowchart illustrating an in-cabin detection method according to an embodiment.

DESCRIPTION OF EMBODIMENT

Figure 1:
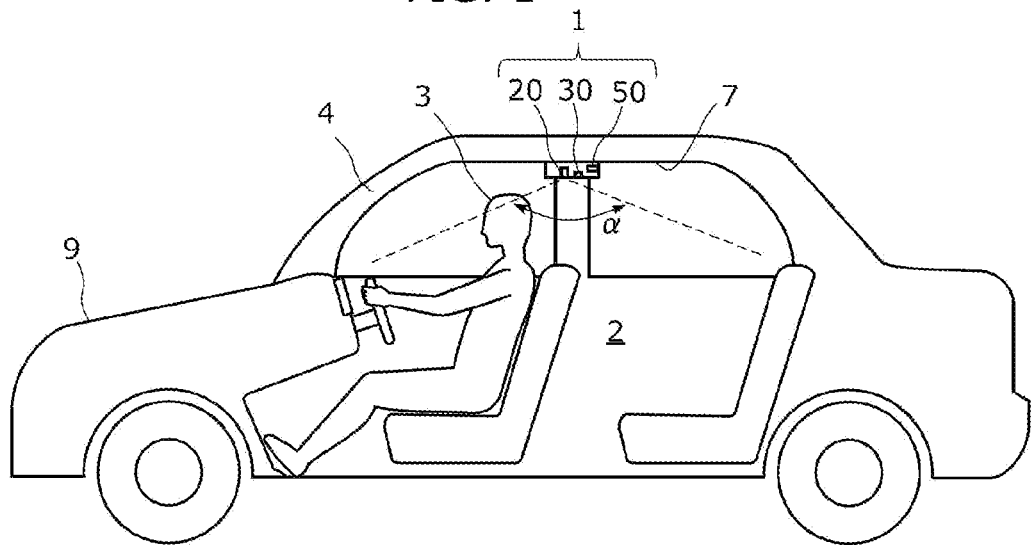
FIG. 1 is a schematic view of an in-cabin monitoring system according to an embodiment viewed from a lateral side in a cabin.

There has been a demand for a technique of detecting things left in cabins, such as mobile phones and wallets, and dirt on seats inside cabins, as car rental business or car sharing is spreading. To detect things left inside cabins or dirt therein, for example, detection of things inside the cabin using an in-cabin monitoring system is considered.

As one example of a method of detecting an object, there is a traditional technique of detecting an object based on a change in concentration of an image captured while the object is being irradiated with light having a predetermined light quantity and a change in concentration of an image captured while the object is being irradiated with light having a light quantity smaller than the predetermined light quantity. According to this technique, the object can be detected even when the object receives ambient light.

However, ambient light entering the inside of the cabin varies depending the weather, the season, the time zone, the orientation of the vehicle, and the interior of the vehicle. For this reason, the traditional technique needs analysis of the change in concentration corresponding to a variety of types of ambient light, which complicates detection of the inside of the cabin.

To reduce influences from ambient light and facilitate detection of the inside of the cabin, the in-cabin monitoring system according to the present disclosure has a configuration described below.

The in-cabin monitoring system according to one aspect of the present disclosure is an in-cabin monitoring system including: a camera which captures an image of an inside of a cabin of a vehicle; a light source which irradiates the inside of the cabin with light; and a controller which controls the camera and the light source. The light source is capable of emitting first light which is to be emitted when checking whether a person is present using the camera and second light which is light stronger than the first light, and before the person gets in the vehicle and after the person gets out of the vehicle, the controller captures an image of the inside of the cabin using the camera while causing the light source to emit the second light.

Thus, by capturing an image of the inside of the cabin while emitting the second light stronger than the first light, the inside of the cabin can be detected with reduced influences from ambient light. By capturing images of the inside of the cabin before the person gets in the vehicle and after the person gets out of the vehicle, a difference between the inside of the cabin before the person gets in the vehicle and that after the person gets out of the vehicle can be readily detected.

The controller may receive a door unlock signal of the vehicle before the person gets in the vehicle, the controller captures an image of the inside of the cabin using the camera, and when the controller receives a door lock signal of the vehicle after the person gets out of the vehicle, the controller may capture an image of the inside of the cabin using the camera.

In such a configuration, images of the inside of the cabin can be captured when the door is unlocked before the person gets in the vehicle and when the door is locked after the person gets out of the vehicle, respectively. Thereby, a difference between the inside of the cabin before the person gets in the vehicle and that after the person gets out of the vehicle can be readily detected.

The controller may determine a difference in a state of an object placed inside the cabin by comparing the image of the inside of the cabin captured in response to the door unlock signal received with the image of the inside of the cabin captured in response to the door lock signal received.

Thereby, a difference between the inside of the cabin before the person gets in the vehicle and that after the person gets out of the vehicle can be readily detected.

The difference in the state of the object placed inside the cabin may be at least one of whether the object placed inside the cabin is present or absent or whether or not the object placed inside the cabin has been damaged or dirty.

Thereby, whether the object placed inside the cabin is present or absent and whether or not the object placed inside the cabin has been damaged or dirty can be detected.

When the controller determines that the state of the object placed inside the cabin is different, the controller may output an abnormality signal.

Thereby, the user of the vehicle can be notified of abnormality in the state of the object placed inside the cabin.

Moreover, when the controller receives the door unlock signal or the door lock signal, the controller may capture an image of the inside of the cabin using the camera while causing the light source to emit the first light before causing the light source to emit the second light, and may determine whether the person is present inside the cabin.

Thus, by determining whether the person is present before the second light is emitted, irradiation of the person with the second light which is strong light can be avoided.

Moreover, when the controller determines that the person is inside the cabin, the controller may not cause the light source to emit the second light, and when the controller determines that no person is inside the cabin, the controller may cause the light source to emit the second light, and may capture an image of the inside of the cabin using the camera.

Thereby, irradiation of the person with the second light can be avoided. Moreover, by capturing an image by emission of the second light which is strong light, an image of the inside of the cabin can be captured with reduced influences from ambient light.

Moreover, the in-cabin monitoring system may further include a storage which stores images captured previously. From the images stored in the storage, the controller may select an image having a layout closest to a layout of the inside of the cabin in an image currently captured, and may determine a difference in the state of the object placed inside the cabin by comparing the image selected and the image currently captured.

Thereby, for example, even in the case where the user changes the layout of the inside of the cabin, the difference in the state of the object placed inside the cabin can be readily detected using the image having a layout closest to that of the inside of the cabin in the image captured.

Moreover, the controller may determine necessity of maintenance of the inside of the cabin by comparing an image previously captured using the camera and an image currently captured using the camera.

Thus, by comparing the image previously captured and the image currently captured, the necessity of maintenance of the inside of the cabin can be appropriately determined.

Moreover, the camera and the light source may be disposed on a ceiling, an overhead console, a room mirror, a dashboard, a steering column, a rearview mirror, an A-pillar, a B-pillar, a C-pillar, or a D-pillar inside the cabin.

Thereby, using the camera and the light source, the state of the object placed inside of the cabin can be appropriately captured. Thereby, the difference in the state of the object placed inside the cabin can be appropriately detected.

The in-cabin detection method according to one aspect of the present disclosure is an in-cabin detection method of detecting an inside of a cabin in a vehicle, the in-cabin detection method including: capturing an image of the inside of the cabin while irradiating the inside of the cabin with light before a person gets in the vehicle, the light being stronger than light to be irradiated when checking whether the person is present using a camera; capturing an image of the inside of the cabin while irradiating the inside of the cabin with the light after the person gets out of the vehicle, the light being stronger than the light to be irradiated when checking whether the person is present using the camera; and comparing the image of the inside of the cabin captured before the person gets in the vehicle with the image of the inside of the cabin captured after the person gets out of the vehicle.

Thus, by capturing an image of the inside of the cabin while irradiating the inside of the cabin with the light stronger than that to be irradiated when checking whether the person is present, the inside of the cabin can be detected with reduced influences from ambient light. Moreover, by comparing the image of the inside of the cabin before the person gets in the vehicle to the image thereof after the person gets out of the vehicle, a difference between the inside of the cabin before the person gets in the vehicle and that after the person gets out of the vehicle can be readily detected.

Hereinafter, an embodiment according to the present disclosure will be described in detail with reference to the drawings. The embodiments described below are exemplary, and should not be construed as limitations to the present disclosure. In other words, the embodiments described below all are comprehensive or specifically illustrative. Numeric values, shapes, materials, components, arrangement positions of components, connection forms thereof, steps, order of steps, and the like shown in the embodiments below are one examples, and should not be construed as limitations to the present disclosure. Among the components of the embodiments below, the components not described in an independent claim representing the most superordinate concept of the present disclosure are described as optional components.

The drawings are schematic views, and are not necessarily precise illustrations. In the drawings, identical reference sings are given to identical constitutional components.

Embodiment

[Configuration of In-Cabin Monitoring System]

A configuration of the in-cabin monitoring system according to an embodiment will be described with reference to FIGS. 1 to 3.

FIG. 1 is a schematic view of in-cabin monitoring system 1 according to an embodiment viewed from a lateral side in cabin 2. FIG. 2 is a diagram illustrating camera 20 and light source 30 included in in-cabin monitoring system 1. FIG. 3 is a block diagram illustrating in-cabin monitoring system 1.

Figure 2:
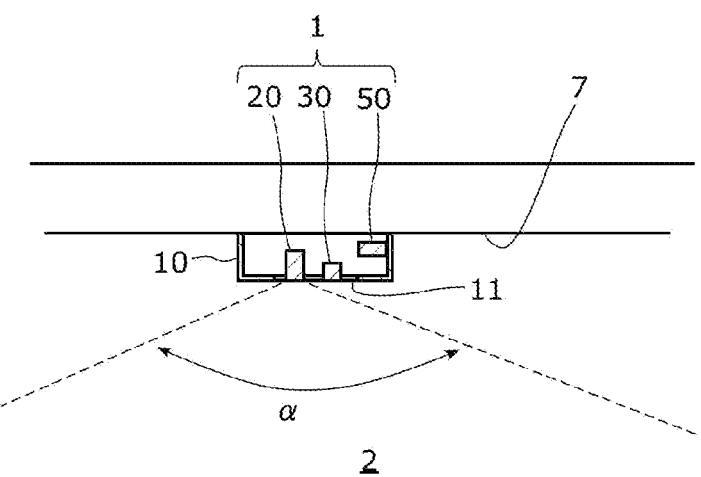
FIG. 2 is a diagram illustrating a camera and a light source included in the in-cabin monitoring system according to the embodiment.
Figure 3:
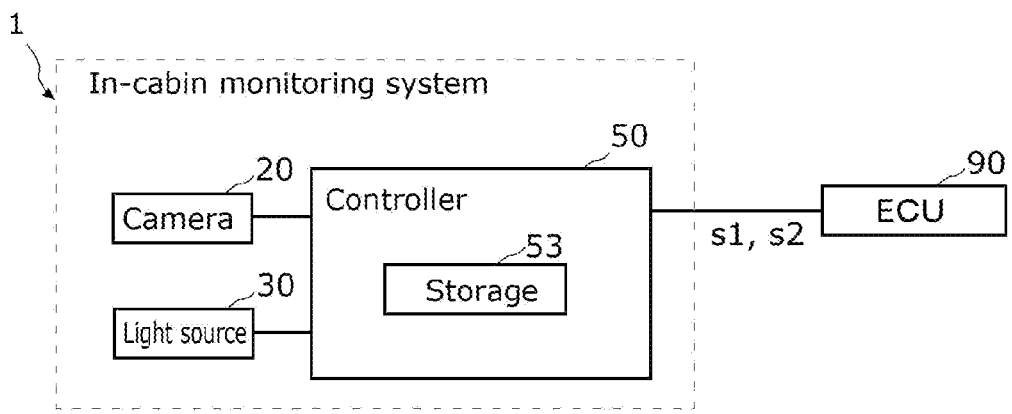
FIG. 3 is a block diagram illustrating the in-cabin monitoring system according to the embodiment.

As illustrated in FIGS. 1 to 3, in-cabin monitoring system 1 includes camera 20, light source 30, and controller 50 which controls camera 20 and light source 30. In-cabin monitoring system 1 also includes housing 10.

Housing 10 is disposed in the center of ceiling 7 inside cabin 2. Housing 10 is a casing made of a resin, and has openings 11. Camera 20 and light source 30 are arranged in openings 11 of housing 10, and controller 50 is arranged inside housing 10. Housing 10 may be disposed on an overhead console located in an upper portion of windshield 4. Alternatively, housing 10 may be disposed on a room mirror, a dashboard, a steering column, a rearview mirror, an A-pillar, a B-pillar, a C-pillar, or a D-pillar. In other words, camera 20 and light source 30 may be disposed in a position enabling capturing of an image of passenger 3 and seats.

Light source 30 is a device which irradiates an inside of cabin 2 with light. Light source 30 includes a plurality of light emitting elements which emit visible light or near-infrared light. Light source 30 is disposed in opening 11 of housing 10 in a direction enabling irradiation of the seats, floors, and passenger 3 with visible light or near-infrared light. Light source 30 can emit first light L1 and second light L2.

Figure 4:
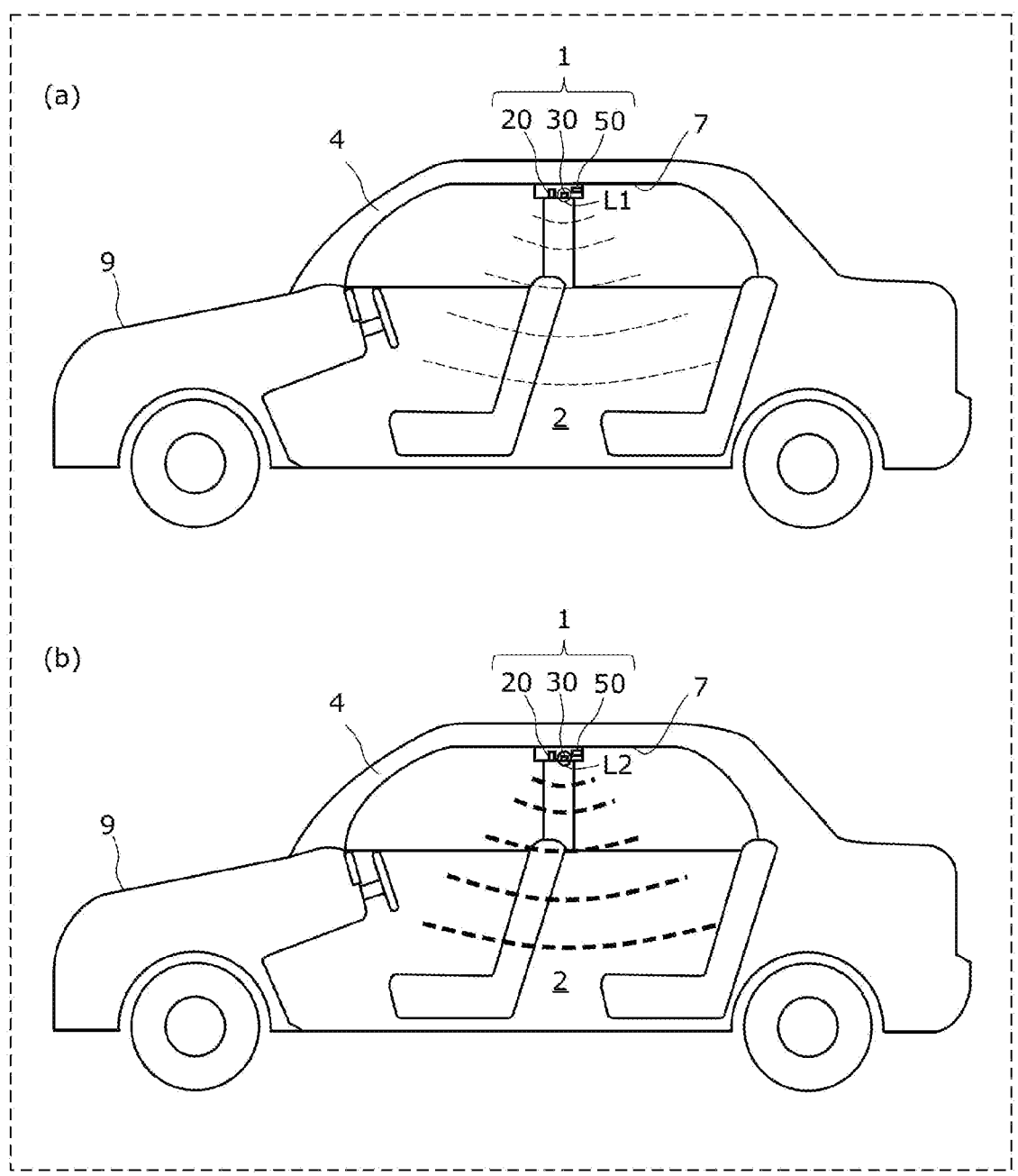
FIG. 4 is a diagram illustrating light emitted from the light source in the in-cabin monitoring system according to the embodiment.

FIG. 4 is a diagram illustrating the light irradiated by emission from light source 30 of in-cabin monitoring system 1. (a) of FIG. 4 illustrates a state where light source 30 emits first light L1, and (b) of FIG. 4 illustrates a state where light source 30 emits second light L2. (a) and (b) of FIG. 4 illustrate a state where there is nothing left inside cabin 2 and there is no passenger 3.

Light source 30 emits first light L1 when checking whether a person is present inside cabin 2 using camera 20. First light L1 has an intensity corresponding to that of light usually used when capturing an image of a person. As the intensity, for example, the illuminance of the light irradiated by emission of first light L1 is 100 lux or more and less than 2000 lux for visible light, and is 0.1 W/m$^2$ or more and less than 1 W/m$^2$ for near-infrared light having a wavelength of 940 nm. Light source 30 also emits second light L2 to reduce influences from ambient light when an image of the inside of cabin 2 is captured using camera 20. Second light L2 is light stronger than first light L1 (light having a higher intensity than that of first light L1). As the intensity, for example, the illuminance of the light irradiated by emission from second light L2 is 2000 lux or more and 100000 lux or less for visible light, and is 1 W/m$^2$ or more and 10 W/m$^2$ or less for near-infrared light having a wavelength of 940 nm. Light source 30 emits first light L1 or second light L2 based on a light emission command issued from controller 50 described later.

Camera 20 is a device which captures an image of the inside of cabin 2 or passenger 3. Camera 20 is disposed in opening 11 of housing 10. Camera 20 is arranged such that the seats, the floors, and passenger 3 are located within angle α of view of the lens of camera 20, namely, is arranged in a direction enabling capturing of an image of the seats, the floors, and passenger 3.

For example, camera 20 is a visible light camera which detects visible light, a near-infrared light camera which detects near-infrared light, or a camera which can detect both types of light. Camera 20 to be used can be a global shutter (GS)-type CMOS image sensor or a CCD image sensor. Camera 20 captures an image of the inside of cabin 2 or passenger 3 based on an image capture command from controller 50. For example, by shortening the emission time of second light L2 which is stronger and the light exposure time of camera 20, controller 50 can capture an image of the inside of cabin 2 with reduced influences from ambient light.

Controller 50 is configured with a processor such as a central processing unit (CPU), storage 53 including a volatile memory and a non-volatile memory, and a program stored in storage 53. The functional configuration of controller 50 is implemented by executing the program. Controller 50 is disposed inside housing 10. Controller 50 can be disposed in any other place, and may be disposed outside housing 10. Controller 50 controls the operations of camera 20, light source 30, and the like while communicating with electronic control unit (ECU) 90 in vehicle 9.

Controller 50 obtains door unlock signal s1 and door lock signal s2 which are signals for locking and unlocking the door of vehicle 9. Door unlock signal s1 is input to controller 50 before a person gets in vehicle 9. Door lock signal s2 is input to controller 50 after the person gets out of vehicle 9. For example, door unlock signal s1 and door lock signal s2 are input to ECU 90 by operation and input by the user of vehicle 9, and are input to controller 50 through ECU 90. Door unlock signal s1 and door lock signal s2 obtained by controller 50 may be the signals themselves received by ECU 90, or may be signals output from ECU 90 in conjunction with the signals received by ECU 90.

In the present embodiment, images of the inside of cabin 2 are captured vehicle 9 using second light L2 before the person gets in vehicle 9 and after the person gets out of vehicle 9. In order to avoid excessive exposure of the person to strong light, controller 50 checks whether the person is present inside cabin 2 before emitting second light L2. Specifically, controller 50 captures an image of the inside of cabin 2 using camera 20 while first light L1 weaker than second light L2 is being emitted. Controller 50 determines whether the person is present inside cabin 2, based on the image captured with first light L1. The determination of whether the person is present based on the image can be implemented by a known technique.

When controller 50 determines that a person is inside cabin 2, controller 50 does not cause light source 30 to emit second light L2, and does not capture an image of the inside of cabin 2. When controller 50 determines that there is no person inside cabin 2 based on the image captured with first light L1, controller 50 causes light source 30 to emit second light L2, and captures the inside of cabin 2 using camera 20.

For example, when controller 50 receives door unlock signal s1 before a person gets in vehicle 9, controller 50 captures an image of the inside of cabin 2 using camera 20 while causing light source 30 to emit second light L2. When controller 50 receives door lock signal s2 after the person gets out of vehicle 9, controller 50 captures an image of the inside of cabin 2 using camera 20 while causing light source 30 to emit second light L2.

Controller 50 determines a difference in a state of an object placed inside cabin 2 by comparing first image im1 of the inside of cabin 2 captured in response to received door unlock signal s1 with second image im2 of the inside of cabin 2 captured in response to received door lock signal s2. Specifically, controller 50 determines the difference in the state of the object placed inside cabin 2 by obtaining the difference between first image im1 and second image im2 (e.g., differences in color or brightness in pixels forming each image).

The difference in the state of the object is at least one of whether the object placed inside cabin 2 is present or absent or whether or not the object placed inside cabin 2 has been damaged or dirty. The object placed inside cabin 2 may be an object brought into cabin 2 from the outside, such as a mobile phone, a wallet, or trash, or may be an object preliminarily arranged inside cabin 2, such as a seat or a floor. In the present embodiment, controller 50 does not need to specify the name of the object, and may determine the difference in the state of the object at least according to whether images im1 and im2 are different.

When controller 50 determines that the state of the object placed inside cabin 2 is different, controller 50 outputs an abnormality signal indicating abnormality, and informs the user of vehicle 9 of abnormality.

In in-cabin monitoring system 1 according to the present embodiment, light source 30 is capable of emitting first light L1 emitted when checking whether a person is present using camera 20 and second light L2 stronger than first light L1; and before the person gets in vehicle 9 and after the person gets out of vehicle 9, controller 50 captures an image of the inside of cabin 2 using camera 20 while causing light source 30 to emit second light L2.

Thus, by capturing an image of the inside of cabin 2 while emitting second light L2 stronger than first light L1, the inside of cabin 2 can be detected with reduced influences from ambient light. By capturing an image of the inside of cabin 2 before the person gets in the vehicle and after the person gets out of the vehicle, a difference between the inside of cabin 2 before the person gets in the vehicle and that after the person gets out of the vehicle can be readily detected.

[In-Cabin Detection Method]

The in-cabin detection method according to an embodiment will be described with reference to FIG. 5.

FIG. 5 is a flowchart illustrating the in-cabin detection method according to an embodiment.

Here, an example in which the state of the object inside cabin 2 is detected using in-cabin monitoring system 1 will be described. Detection of the object inside cabin 2 is executed when vehicle 9 is parked.

In-cabin monitoring system 1 receives door unlock signal s1 before the person gets in vehicle 9 (step S11). For example, controller 50 receives door unlock signal s1 through ECU 90 by operation of the key by user.

When receiving door unlock signal s1, controller 50 checks whether the person is present inside cabin 2. Specifically, controller 50 causes light source 30 to emit first light L1 to irradiate the inside of cabin 2 with light, and captures an image of the inside of cabin 2 using camera 20 (step S12). The emission time of light L1 is 0.1 ms or more and 10 ms or less, for example.

Using the image obtained when first light L1 is emitted, controller 50 determines whether a person is inside cabin 2 (step S13).

When controller 50 determines that the person is inside cabin 2 (Yes in S13), controller 50 does not cause light source 30 to emit second light L2, does not capture an image of the inside of cabin 2, and returns to step S11. At this time, controller 50 may output a signal for prompting the person inside cabin 2 to get out of cabin 2 to ECU 90, and ECU 90 may notify the person inside cabin 2 to get out of cabin 2, using an acoustic device in cabin 2.

When controller 50 determines that there is no person inside cabin 2 (No in S13), controller 50 causes light source 30 to emit second light L2 to irradiate the inside of cabin 2 with light, and captures an image of the inside of cabin 2 using camera 20 (step S14). The emission time of second light L2 is 0.1 ms or more and 10 ms or less, for example.

Controller 50 stores the image obtained when second light L2 is emitted, as first image im1 in storage 53 (step S15). First image im1 is a still picture first captured in the usage period of vehicle 9, and the time and day of the capturing is also stored in association with first image im1 in storage 53.

Next, the processing after the end of traveling of vehicle 9 by the user will be described.

In-cabin monitoring system 1 receives door lock signal s2 after the person gets out of vehicle 9 (step S16). For example, controller 50 receives door lock signal s2 through ECU 90 by operation of the key by the user.

When receiving door lock signal s2, controller 50 checks whether the person is present inside cabin 2. Specifically, controller 50 causes light source 30 to emit first light L1 to irradiate the inside of cabin 2 with light, and captures the inside of cabin 2 using camera 20 (step S17). The emission time of first light L1 is 0.1 ms or more and 10 ms or less, for example.

Controller 50 determines whether a person is inside cabin 2, using the image obtained when first light L1 is emitted (step S18).

When controller 50 determines that the person is inside cabin 2 (Yes in S18), controller 50 does not cause light source 30 to emit second light L2, does not capture an image of the inside of cabin 2, and returns to step S16. At this time, controller 50 may output a signal for prompting the person inside cabin 2 to get out of cabin 2 to ECU 90, and ECU 90 may notify the person inside cabin 2 to get out of cabin 2, using an acoustic device in cabin 2.

When controller 50 determines that there is no person inside cabin 2 (No in S18), controller 50 causes light source 30 to emit second light L2 to irradiate the inside of cabin 2 with light, and captures an image of the inside of cabin 2 using camera 20 (step S19). The emission time of second light L2 is 0.1 ms or more and 10 ms or less, for example.

Controller 50 stores the image obtained when second light L2 is emitted, as second image im2 in storage 53 (step S20). Second image im2 is a still picture last captured in the usage period of vehicle 9, and the time and day of the capturing is also stored in storage 53.

Next, controller 50 compares first image im1 with second image im2 to determine a difference in the state of the object inside cabin 2 (step S21).

When controller 50 determines that there is a difference in the state of the object inside cabin 2 (Yes in S21), controller 50 outputs an abnormality signal indicating abnormality to ECU 90 (step S22). When controller 50 determines that there is no difference in the state of the object inside cabin 2 (No in S21), controller 50 outputs a normality signal indicating no abnormality to ECU 90 (step S23). The information based on the abnormality signal and that based on the normality signal are presented on a communication terminal of the user by communication via the Internet or Bluetooth (registered trademark).

The in-cabin detection method in in-cabin monitoring system 1 is implemented by executing these steps S11 to S23.

The in-cabin detection method according to the present embodiment includes capturing an image of an inside of cabin 2 while irradiating the inside of cabin 2 with light before a person gets in vehicle 9, the light being stronger than light to be irradiated when checking whether the person is present using camera 20; capturing an image of the inside of cabin 2 while irradiating the inside of cabin 2 with light after the person gets out of vehicle 9, the light being stronger than the light to be irradiated when checking whether the person is present using camera 20; and comparing image im1 of the inside of cabin 2 captured before the person gets in vehicle 9 with image im2 of the inside of cabin 2 captured after the person gets out of vehicle 9.

Thus, by capturing an image of the inside of cabin 2 while irradiating the inside of cabin 2 with the light stronger than the light to be irradiated when checking whether the person is present, the inside of cabin 2 can be detected with reduced influences from ambient light. By comparing an image of the inside of cabin 2 before the person gets in the vehicle and that after the person gets out of the vehicle, the difference in inside of cabin 2 between before the person gets in the vehicle and after the person gets out of the vehicle can be readily detected.

Next, modifications of the embodiment will be described.

Although first image im1 and second image im2 are stored in storage 53, any other image can be stored in storage 53. For example, images previously captured, such as images captured when the vehicle was new, may be stored in storage 53. The images may include images of the inside of cabin 2 having different layouts with different seat positions or different seat back angles. From the images stored in storage 53, controller 50 may select an image of the inside of cabin 2 having a layout closest to the layout of the inside of cabin 2 in the image currently captured, and may determine a difference in the state of the object placed inside cabin 2 by comparing the selected image and the image currently captured.

Although controller 50 determines the difference in the state of the object inside cabin 2, based on the images first and last captured in the usage period of vehicle 9, controller 50 can determine the difference in the state of the object inside cabin 2, based on any other images. For example, controller 50 may determine necessity of maintenance of the inside of cabin 2 by comparing an image previously captured using camera 20 with an image currently captured using camera 20. The image previously captured is an image captured when the vehicle was new, for example. The maintenance of the inside of cabin 2 is repair or exchange of a seat cover or a floor mat, for example. Controller 50 may notify the user of the result of determination whether the maintenance is needed.

Other Embodiments

As described above, the embodiment and the modifications of the embodiment have been described as examples of the technique disclosed in this application. However, the technique is not limited to the embodiment and the modifications of the embodiment, and can also be applied to embodiments obtained by appropriate change, replacement, addition, or omission thereof. The components described in the embodiments above can be combined into new embodiments.

Although an example in which when receiving door unlock signal s1 and door lock signal s2, controller 50 captures an image of the inside of cabin 2 using camera 20 has been illustrated in the embodiment above, any other configuration can be used. For example, controller 50 may receive a pre-capturing instruction signal instead of door unlock signal s1 and a post-capturing instruction signal instead of door lock signal s2, and may capture an image of the inside of cabin 2 using camera 20 in response to each received signal.

Although an example in which camera 20 and light source 30 are disposed on ceiling 7 has been illustrated in the embodiment above, camera 20 and light source 30 may be disposed on any other position. Camera 20 and light source 30 may be disposed at least one of ceiling 7, an overhead console, a room mirror, a dashboard, a steering column, a rearview mirror, an A-pillar, a B-pillar, a C-pillar, or a D-pillar inside cabin 2. A plurality of light sources 30 may be disposed inside cabin 2. A plurality of cameras 20 may be disposed inside cabin 2.

Although the embodiments according to the present disclosure have been described in detail with reference to the drawings, the functions of the devices and the processors above can be implemented with a computer program.

A computer which implements the functions described above with a program includes an input device such as a touch pad, output devices such as a display and a loudspeaker, a processor or a central processing unit (CPU), a read only memory (ROM), a random access memory (RAM), a memory device such as a hard disk device or a solid state drive (SSD), a reader which reads information from a recording medium such as a digital versatile disk read only memory (DVD-ROM) or a universal serial bus (USB) memory, and a network card which performs communication through a network. These components are connected through buses.

The reader reads the program from the recording medium having the program recorded thereon, and stores the program in the memory device. Alternatively, the network card communicates with a server apparatus connected to the network, and stores the program for implementing the functions of the devices in the memory device, the program being downloaded from the server apparatus.

The processor or the CPU copies the program stored in the memory device to the RAM, and sequentially reads and executes commands included in the program from the RAM, thereby implementing the functions of the devices above.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent applications including specification, drawings and claims are incorporated herein by reference in their entirety: Japanese Patent Application 2021-058776 filed on Mar. 30, 2021.

INDUSTRIAL APPLICABILITY

The in-cabin monitoring system according to the present disclosure can be used in monitoring insides of cabins.

The invention claimed is:

1. An in-cabin monitoring system, comprising:
a camera which captures images of an inside of a cabin of a vehicle;
a light source which irradiates the inside of the cabin with light; and
a controller which controls the camera and the light source,
wherein the light source is capable of emitting first light which is to be emitted when checking whether a person is present using the camera and second light which is light stronger than the first light,
before a user gets in the vehicle and after the user gets out of the vehicle, the controller captures a first image of the inside of the cabin using the camera while causing the light source to emit the second light,
when the controller receives a door unlock signal of the vehicle before the user gets in the vehicle, the controller checks whether no person is present in the inside of the cabin via emitting the first light, and then, after the controller checks whether no person is present in the inside of the cabin via emitting the first light, the controller captures a second image of the inside of the cabin using the camera via emitting the second light, and
when the controller receives a door lock signal of the vehicle after the user gets out of the vehicle, the controller checks whether no person is present in the inside of the cabin via emitting the first light, and then, after the controller checks whether no person is present in the inside of the cabin via emitting the first light, the controller captures a third image of the inside of the cabin using the camera via emitting the second light.

2. The in-cabin monitoring system according to claim 1, wherein the controller determines a difference in a state of an object placed inside the cabin by comparing the second image of the inside of the cabin captured in response to the door unlock signal being received with the third image of the inside of the cabin captured in response to the door lock signal being received.

3. The in-cabin monitoring system according to claim 2, wherein the difference in the state of the object placed inside the cabin is at least one of whether the object placed inside the cabin is present or absent or whether or not the object placed inside the cabin has been damaged or dirty.

4. The in-cabin monitoring system according to claim 2, wherein when the controller determines that the state of the object placed inside the cabin is different, the controller outputs an abnormality signal.

5. The in-cabin monitoring system according to claim 2, further comprising:
a storage which stores images captured previously,
wherein from the images stored in the storage, the controller selects an image having a layout closest to a layout of the inside of the cabin in an image currently captured, and determines a difference in the state of the object placed inside the cabin by comparing the image selected and the image currently captured.

6. The in-cabin monitoring system according to claim 1, wherein when the controller receives the door unlock signal or the door lock signal, the controller captures a fourth image of the inside of the cabin using the camera while causing the light source to emit the first light before causing the light source to emit the second light, and determines whether no person is present in the inside of the cabin.

7. The in-cabin monitoring system according to claim 6, wherein when the controller determines that the person is present in the inside of the cabin, the controller does not cause the light source to emit the second light, and when the controller determines that no person is present in the inside of the cabin, the controller causes the light source to emit the second light, and captures the second image or the third image of the inside of the cabin using the camera.

8. The in-cabin monitoring system according to claim 1, wherein the controller determines necessity of maintenance of the inside of the cabin by comparing an image previously captured using the camera and an image currently captured using the camera.

9. The in-cabin monitoring system according to claim 1, wherein the camera and the light source are disposed on a ceiling, an overhead console, a room mirror, a dashboard, a steering column, a rearview mirror, an A-pillar, a B-pillar, a C-pillar, or a D-pillar inside the cabin.

10. An in-cabin detection method of detecting an inside of a cabin in a vehicle, the in-cabin detection method comprising:
capturing a first image of the inside of the cabin while irradiating the inside of the cabin with second light before a user gets in the vehicle, the second light being stronger than first light to be irradiated when checking whether a person is present using a camera;
capturing a second image of the inside of the cabin while irradiating the inside of the cabin with the second light after the user gets out of the vehicle;
comparing the first image of the inside of the cabin captured before the user gets in the vehicle with the second image of the inside of the cabin captured after the user gets out of the vehicle;
when a door unlock signal of the vehicle is received before the user gets in the vehicle, checking whether no person is present in the inside of the cabin via emitting the first light, and then, after checking whether no person is present in the inside of the cabin via emitting the first light, capturing a third image of the inside of the cabin using the camera via emitting the second light; and
when a door lock signal of the vehicle is received after the user gets out of the vehicle, checking whether no person is present in the inside of the cabin via emitting the first light, and then, after checking whether no person is present in the inside of the cabin via emitting the first light, capturing a fourth image of the inside of the cabin using the camera via emitting the second light.

* * * * *